OXIDATION OF BORON SILICIDE ($B_6Si$) IN STAGNANT AIR

United States Patent Office 3,275,467
Patented Sept. 27, 1966

3,275,467
COATED GRAPHITE AND METHOD
OF COATING
Ervin Colton, Wauwatosa, Wis., assignor to Allis-Chalmers
Manufacturing Company, Milwaukee, Wis.
Filed Apr. 26, 1963, Ser. No. 275,979
4 Claims. (Cl. 117—46)

This invention relates generally to a coating for graphite bodies and more particularly to graphite articles coated with flame sprayed boron silicides.

Graphite is one of the most promising ceramic materials for rocket and space applications because of its favorable strength properties at elevated temperatures. Besides having a low specific gravity, which is of utmost importance in rocket applications, graphite, unlike most materials, becomes stronger at elevated temperatures. Unfortunately, however, graphite is greatly susceptible to oxidation. Its use in even slightly oxidizing atmospheres is severely limited since oxidation of graphite will begin at about 450° to 600° C. Furthermore, graphite is also readily affected by abrasion so that even the slightest abrasive action will severely wear the surface of a graphite article. Consequently, it is very important that suitable coatings be developed for graphite and other carbon base materials in order to extend their useful life into higher working temperatures in oxygen containing atmospheres.

Two approaches have generally been employed in trying to produce a more oxidation resistant and abrasion resistant graphite. One employs impregnation techniques, whereby graphite and some oxidation retardants such as phosphoric acid or sodium tungstate are fabricated together. The other method utilizes a coating technique, such as flame spraying or vapor deposition, whereby refractory metals or ceramics have been deposited onto the graphite surfaces providing a protective coating.

Heretofore, however, neither approach has produced completely satisfactory results. In general, the coated graphite has suffered from three principal difficulties: (1) the coating does not adhere well, (2) the coating cracks upon heating due to different expansion rates between the coating and the graphite, and (3) the coating is not stable at the higher temperatures where the use of graphite is desired.

I have found, however, that certain boron silicide coatings can be used to protect graphite over an extremely wide range of temperatures, adhere well and are compatible with the underlying graphite as to useful temperatures.

Accordingly, it is an object of this invention to provide coated graphite articles which are extremely oxidation and abrason resistant at elevated temperatures.

It is another object of this invention to provide a coating for graphite articles which will adhere extremely well over a wide range of temperatures.

It is still another object of this invention to provide a coating for graphite articles which is compatible with graphite as to useful temperatures.

It is a further object of this invention to provide methods whereby these boron silicides may be coated onto the graphite bodies.

These and other objects and advantages as shall hereinafter appear are readily accomplished by this invention, particularly when read in view of the accompanying figures in which.

Figure 1:
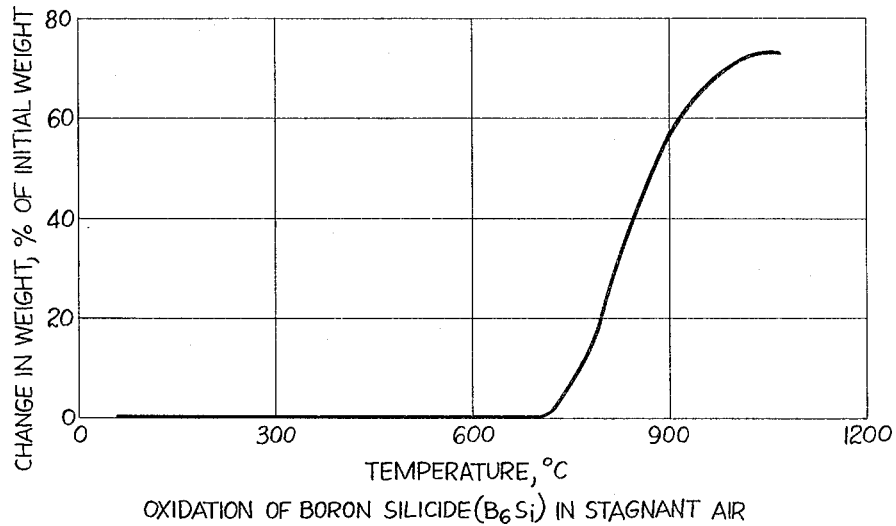
FIG. 1 is a graph showing the thermal gravimetric analysis of boron silicide powder in stagnant air.

In my copending patent applications, Serial Numbers 78,152 and 862,933 and my copending joint patent application with Dr. Matkovich, Serial Numbers 820,886, Now U.S. Patent No. 3,138,468, and 50,912, now abandoned, the physical properties of tetraboron silicide, $B_4Si$, and hexaboron silicides, $B_6Si$, and various methods of preparing these silicides have been thoroughly described. In these above mentioned patent applications it was noted that boron silicides are oxidation resistant at high temperatures. This oxidation resistance results from the fact that when a body of one of these boron silicides is heated in air, a boron - silicon - oxygen phase forms on the outer surface, creating a thin oxide coating which protects the underlying material from further oxidation. Formation of the boron-silicon-oxygen phase commences when boron silicide is heated to about 700° C. in the presence of oxygen. This is shown in FIG. 1 where at about 705° C. and in an atmosphere of air, hexaboron silicide powder commences to oxidize. For the test in FIG. 1 the boron silicide was in powder form and thus it was possible to take the oxidation to completion which resulted in an increase in weight of about 75 percent. However, for composite or solid bodies of boron silicide, there would be no possibility of complete oxidation into the interior of the body, but only oxidation of the outer surface layer. Once the protective layer completely covers the body, further oxidation virtually ceases as is exemplified in FIG. 2. It should be kept in mind that this is true even for porous sintered bodies as well, as the boron-silicon-oxygen phase in effect seals the pores at the surface where the phase is formed.

Figure 2:
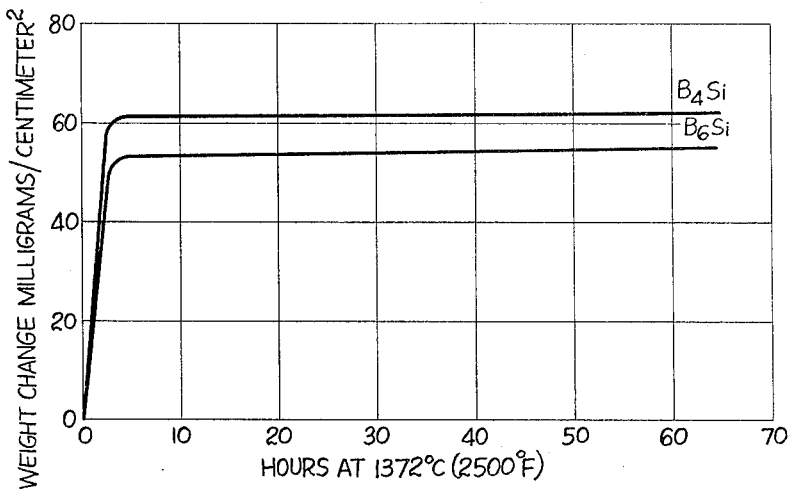
FIG 2 is a graph showing the oxidation characteristics of boron silicides in stagnant air.

FIG. 2 shows that if porous sintered bodies of tetraboron silicide and hexaboron silicide are heated at 1372° C. in contact with air for 70 hours, oxidation will occur in the first 3 to 4 hours, where there will be an increase in weight of from 50 to 60 mg. per square cm. of surface area. Thereafter, there will be no substantial change in weight since the outer oxide coating protects the underlying material from further oxidation.

In one practice of my invention powders either of tetraboron silicide or hexaboron silicide as mentioned above are coated onto the graphite article to be protected. Since the coating is mechanical in nature, it is necessary that the surface of the graphite article be slightly roughened to insure better bonding. Such roughening can be accomplished by rough sandpaper or grit blasting. The coating can then be applied by any of several means. For example, the coating can be brushed on using a liquid suspension of boron silicide powder in a rapidly evaporating solvent such as chloroform. Additions such as Lucite, polyethylene, nylon and other plastic materials, can be employed to thicken the suspension and provide for enhanced adherence of the boron silicide powder to the base material.

The preferred manner for applying boron silicide to the graphite base, however, is by flame spraying. In this technique a torch is used which sprays powders of about minus 100 mesh by means of an extremely high temperature inert gas stream, such as argon, helium or hydrogen, onto the base material to be coated. Upon contact with the cool base material, the momentarily molten powder particles freeze, forming an interlocking network. The techniques of flame spraying are well known to those skilled in the art and thus need not be elaborated here.

The thickness of the coating is not of great concern. Generally, thicknesses of 3 to 10 mils proved to be most satisfactory. Coatings in excess of 10 mils tend to be too brittle, while coatings less than 3 mils are too thin to provide sufficient protection. Thus coatings between 3 and 10 mils should provide sufficient protection for the underlying graphite as well as maintain sufficient flexibility to cracking.

The boron silicide coating as deposited by either of the above methods may be somewhat porous and thus will not be completely sufficient in and of itself to protect the graphite base material. Thus, in order to provide the protection necessary, the outer surface of the boron silicide coating must be oxidized to the boron-silicon-oxygen phase. From FIG. 1, however, it is noted that the oxide phase will not begin to form until a temperature of about 700° C. is reached. And since graphite begins to oxidize at about 400 to 600° C., it is apparent that the graphite will commence to oxidize away long before the boron-silicon-oxygen can be formed to prevent it. To overcome this problem, I have developed a proprietary heat treatment which will render the boron silicide coating impervious to air so that the graphite will not be oxidized while the boron-silicon-oxygen phase is being formed. To accomplish this, the coated graphite article is heated in an inert atmosphere, such as argon, at a temperature of about 1000 to 1500° C. for a period of about one-fourth to one hour, depending upon the size of the part. The inert gas used is immaterial since the only consideration is that it be a gas which does not react wtih boron silicide. However, an atmosphere of nitrogen should not be used because some small amount of free silicon may be present in the boron silicide, which would cause the formation of silicon nitride ($Si_3N_4$). Such a nitride would be detrimental to the coating because the nitride in turn will react with oxygen at elevated temperatures. This heat treatment causes a reaction in the boron silicide coating, which is yet unexplainable, making the boron silicide impermeable to air. Subsequent heating in air at temperatures in excess of 705° C. will cause formation of the boron-silicon-oxygen phase without oxidation of the graphite base material.

Figure 3:
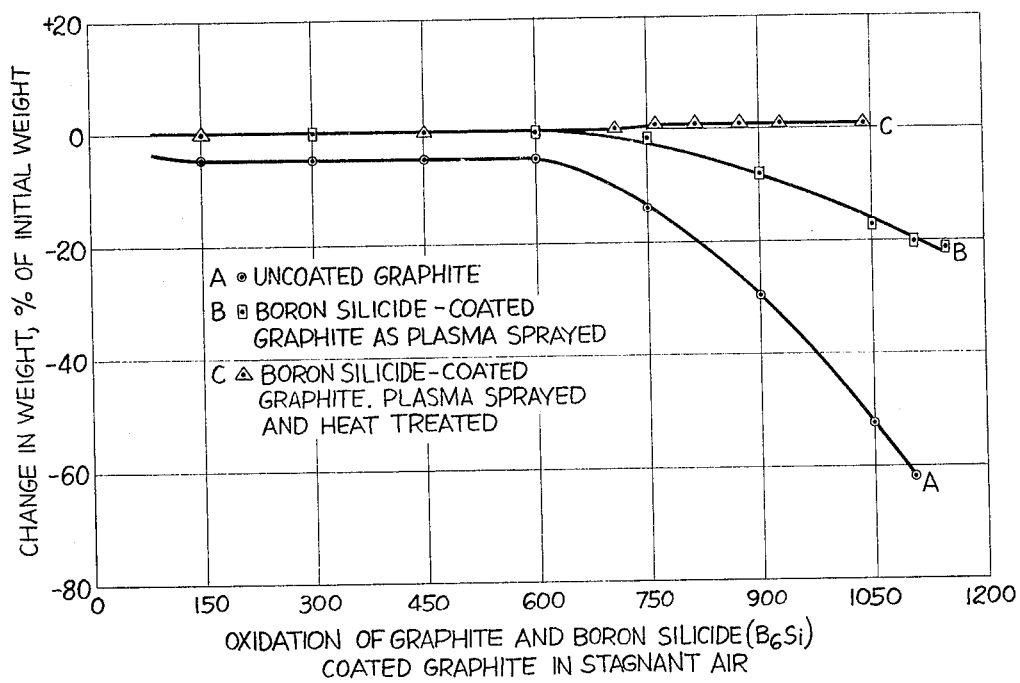
FIG 3 is a graph showing comparisons of the oxidation of graphite, boron silicide coated graphite and heat treated boron silicide coated graphite in stagnant air.

FIG. 3 graphically shows the variance of the oxidation of the three materials; namely, uncoated graphite, coated graphite and coated and heat treated graphite. Line A shows that the uncoated graphite almost immediately loses some weight due to oxidation. Then at temperatures above 600° C., oxidation becomes so severe that at 1050° C. over half of the material is oxidized away. Graphite coated with the as-sprayed boron silicide is considerably more resistant to oxidation as depicted by line B; however, some oxidation is still possible due to the porous nature of the coating. Line C shows that there was no measurable oxidation of graphite which had been flame sprayed with boron silicide and heat treated in inert atmosphere prior to air oxidation.

It is of course important that pinhole imperfections be avoided in the boron silicide coating since oxidation of the graphite base material will occur through such an imperfection, leaving the coating intact as an empty shell. Careful coating procedures can reduce such imperfections to insure a greater yield. Since careful coating techniques are well known to those skilled in the art, they will not be discussed here.

The boron silicide coating is quite adherent to the graphite. It will not crack upon repeated cycling from 980° C. to room temperature or upon continuous exposure to air at 980° C. In one test, a boron silicide coated graphite piece was water quenched from 1260° C. without cracking. This excellent adherence of boron silicide to graphite is due, at least in part, to their closely matching expansion coefficients. The expansion coefficient for graphite is about $5.2 \times 10^{-6}$ per deg. C., while the expansion coefficient for the boron silicides sintered in air is $6.3 \times 10^{-6}$ per deg. C.

To aid in a fuller understanding of my invention, the following examples are presented as being typical. However, they are meant only to be illustrative of the invention herein described.

EXAMPLE I

A pellet of graphite (Speer Carbon Co. grade 580) was prepared to be about one inch long by one-half inch in diameter with slightly rounded corners and slightly roughened surfaces. Boron silicide ($B_6Si$) powder of —200 mesh particle size was plasma sprayed in argon onto the graphite using about 450 amps. and 26 volts. A layer of approximately three mils was formed. After weighing the sample, it was placed on insulating brick and heated from room temperature to about 800° C. over a period of from one and one-half to two hours in stagnant air. The sample was removed directly from the furnace and allowed to cool to room temperature while the furnace temperature was raised. The cool sample was measured and weighed (to supply data for FIG. 3) and reinserted into the hot furnace. No cracking took place, thus illustrating good adherence of the coating and good thermal shock properties. The sample was maintained at furnace temperatures about 800° C. for one hour and the above procedure repeated at still higher temperatures. There was a weight loss after the first heat treatment due to some oxidation of graphite but no appreciable weight loss on the subsequent heat treatments because the protective boron-silicon-oxygen coating had formed.

EXAMPLE II

A pellet of graphite (Speer Carbon Co. grade 580) one inch in length and one-half inch in diameter having slightly roughened surfaces was plasma sprayed with —200 mesh boron silicide powder ($B_6Si$) through an argon atmosphere using about 450 amps. and 26 volts. A layer of approximately three mils was formed. After weighing the sample, it was heated to a temperature of about 1500° C. in an argon atmosphere and there maintained for one-half hour. The sample was then heated in stagnant air and cooled to room temperature and weighed (to supply data for FIGS. 2 and 3). The sample was repeatedly heated to higher and higher temperatures with interim cooling to note weight changes. The sample did not crack and adherence was good. There was a slight increase in weight after the first heat treatment in air caused by the formation of the protective boron-silicon-oxygen phase. There was no appreciable weight change after the other heat treatments.

Having now particularly described and ascertained the nature of my said invention and the manner in which it is to be performed, I declare that what I claim is:

1. The method of rendering graphite articles abrasion and oxidation resistant the steps comprising, depositing a silicide coating selected from the group consisting of hexaboron silicide and tetraboron silicide onto the said graphite article by flame spraying means, said silicide coating having a thickness of from about 3 to about 10 mils, heating the silicide coating at a temperature of from about 1000 to 1500° C. for a period of about one-fourth to one hour in a nitrogen-free inert atmosphere, and again heating the said coated graphite article at a temperature in excess of 700° C. for a period of about one-fourth to one hour in an atmosphere containing oxygen.

2. An oxidation and abrasion resistant carbon base article comprising, a structural body of graphite having a flame sprayed coating of a silicide selected from a group consisting of hexaboron silicide and tetraboron silicide, said coating having a thickness of from about 3 to about 10 mils and having an impermeable outer surface formed by heating said silicide coating to a temperature of from about 1000 to about 1500° C. in a nitrogen-free inert atmosphere for a period of from about one-fourth to one hour, and then heating said silicide coating at a temperature in excess of 700° C. in an oxygen containing atmosphere for a period of at least one-fourth of an hour.

3. The method of rendering graphite articles abrasion and oxidation resistant the steps comprising, admixing a rapidly evaporating liquid solvent with a powdered silicide selected from the group consisting of hexaboron silicide and tetraboron silicide to form a liquid suspension, brushing said liquid suspension on to a graphite article and allowing the liquid solvent to evaporate to provide a silicide coating on said graphite article having a thickness of from about 3 to about 10 mils, heating the silicide coating at a temperature of from about 1000 to about 1500° C. in a nitrogen-free inert atmosphere for a period of from about one-fourth to one hour, and then heating said silicide coating at a temperature in excess of 700° C. in an oxygen containing atmosphere for a period of at least about one-fourth hour.

4. An oxidation and abrasion resistant carbon base article comprising, a structural body of graphite having a powder coating of a silicide selected from the group consisting of hexaboron silicide and tetraboron silicide, said coating having a thickness of from about 3 to about 10 mils and deposited by brushing the powder onto said graphite article while said powder is suspended in a rapidly evaporating solvent, and said silicide coating having an impermeable outer surface formed by heating said coating to a temperature of from about 1000 to about 1,500° C. in a nitrogen-free inert atmosphere for a period of from about one-fourth to one hour, and then heating said silicide coating at a temperature in excess of 700° C. in an oxygen containing atmosphere for a period of at least one-fourth of an hour.

References Cited by the Examiner

UNITED STATES PATENTS

| | | | |
|---|---|---|---|
| 2,598,371 | 5/1952 | Gusdorf | 117—121 |
| 2,662,835 | 12/1953 | Reid | 117—121 |
| 2,866,718 | 12/1958 | Guzzetta | 117—21 |
| 2,920,001 | 1/1960 | Smith et al. | 117—21 |
| 2,995,471 | 8/1961 | Gurinsky | 117—121 X |
| 3,131,089 | 4/1964 | Grulke et al. | 117—121 X |

OTHER REFERENCES

"Dept. of Commerce OTS 56–220," Nov. 11, 1956.
"Materials in Design Eng.," August 1962, pp. 106–109.

MURRAY KATZ, *Primary Examiner.*

WILLIAM D. MARTIN, *Examiner.*